(12) United States Patent
Namazue et al.

(10) Patent No.: US 8,923,681 B2
(45) Date of Patent: Dec. 30, 2014

(54) OPTICAL FIBER CORE

(71) Applicant: Fujikura Ltd., Kohtoh-ku, Tokyo (JP)

(72) Inventors: Akira Namazue, Sakura (JP); Akira Murata, Sakura (JP); Mizuki Isaji, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/688,842

(22) Filed: Nov. 29, 2012

(65) Prior Publication Data

US 2013/0084051 A1    Apr. 4, 2013

Related U.S. Application Data

(63) Continuation of application No. PCT/JP2011/062681, filed on Jun. 2, 2011.

(30) Foreign Application Priority Data

Jun. 2, 2010   (JP) .................. 2010-126910

(51) Int. Cl.
| G02B 6/00 | (2006.01) |
| B05D 5/06 | (2006.01) |
| G02B 6/02 | (2006.01) |
| C03C 25/24 | (2006.01) |
| C08F 2/50 | (2006.01) |
| C08F 283/10 | (2006.01) |
| C03C 25/10 | (2006.01) |
| C08G 18/67 | (2006.01) |
| G02B 6/10 | (2006.01) |

(52) U.S. Cl.
CPC .............. *G02B 6/10* (2013.01); *C03C 25/1065* (2013.01); *G02B 6/02395* (2013.01)

USPC ........... 385/143; 385/128; 385/141; 385/142; 427/163.2; 65/447; 522/64; 522/92; 522/96; 522/97

(58) Field of Classification Search
USPC .......................................... 385/143
See application file for complete search history.

(56) References Cited

U.S. PATENT DOCUMENTS

| 5,416,880 A | 5/1995 | Edwards et al. |
| 5,664,041 A * | 9/1997 | Szum .............................. 385/128 |
| 2002/0102086 A1 | 8/2002 | Fewkes et al. |

FOREIGN PATENT DOCUMENTS

| JP | 9-508886 A | 9/1997 |
| JP | 2006-215445 A | 8/2006 |
| JP | 2007-334111 A | 12/2007 |

OTHER PUBLICATIONS

International Search Report for PCT/JP2011/062681 dated Jul. 12, 2011.
Office Action issued by Chinese Patent Office in Chinese Application No. 201180026295.4 mailed May 29, 2014.

* cited by examiner

*Primary Examiner* — Tina Wong
*Assistant Examiner* — Kajli Prince
(74) *Attorney, Agent, or Firm* — Sughrue Mion, PLLC

(57) ABSTRACT

An optical fiber core having a primary layer and a secondary layer, which are laminated on a bare optical fiber. The primary layer is formed by curing an ultraviolet-curable resin composition containing a first silane coupling agent, which can be incorporated into a resin skeleton, and a second silane coupling agent, which cannot be incorporated into a resin skeleton. The first silane coupling agent contains a compound having a methoxy group, and the second silane coupling agent contains a compound having an ethoxy group.

8 Claims, 2 Drawing Sheets

OPTICAL FIBER CORE

CROSS REFERENCE TO RELATED APPLICATIONS

This application is a continuation application based on a PCT Patent Application No. PCT/JP2011/062681, filed Jun. 2, 2011, whose priority is claimed on Japanese Patent Application No. 2010-126910 filed Jun. 2, 2010, the entire contents of which are hereby incorporated by reference.

BACKGROUND OF THE INVENTION

1. Field of the Invention

The present invention relates to an optical fiber and an optical fiber core for which the optical fiber is utilized. More particularly, the present invention relates to a resin coating around a bare optical fiber that composes the optical fiber.

2. Description of the Related Art

In recent years, optical fibers have become popular to use, and thus optical fiber cables have been laid down in a variety of environments. In some environments, since water may infiltrate into the inside of optical fiber cables, optical fibers are required to be highly reliable for a long period of time.

Optical fibers made of fused silica are used for optical communication. Generally, such an optical fiber has a structure in which a first layer (primary layer) with a relatively soft resin and a second layer (secondary layer) with a relatively hard resin are laminated around a bare optical fiber (glass optical fiber) that is made of fused silica, and is composed of a core and a clad. The first layer (primary layer) contributes to reducing lateral pressure to the bare optical fiber, and the second layer (secondary layer) contributes to preventing damage to the bare optical fiber. Ultraviolet-curable resins are mostly used as the resins described above.

When conventional optical fiber cores are exposed to water derived from environments, close contact between primary layers and bare optical fibers will be changed. For example, a decrease of the close contact may cause projection, microbend or the like of bare optical fibers, and thereby transmission loss of the optical fiber cores may be increased. Also, when the close contact is increased, sometimes primary layers covering bare optical fibers become difficult to remove. Note that such removal is required for maintenance and the like for optical fiber cores.

To solve the problem, for example, Japanese Unexamined Patent Application, First Publication No. 2007-334111 discloses a method for suppressing detachment of an interface between a glass optical fiber (bare optical fiber) and a flexible covering layer, by defining a relationship between Young's modulus of the flexible covering layer (primary layer) and Young's modulus of a rigid covering layer.

In conventional optical fiber cores, close contact between bare optical fibers and primary layers is not sufficiently stable, and therefore increased stability has been desired.

The present invention has been completed in light of the above situation, and an object of the present invention is to provide an optical fiber core, in which close contact between a bare optical fiber and a primary layer is stably maintained even if the optical fiber core is used under an environment in which it has been exposed to water.

SUMMARY OF THE INVENTION

In one aspect of the present invention, an optical fiber core has a primary layer and a secondary layer, which are laminated on a bare optical fiber, in which the primary layer is formed by curing an ultraviolet-curable resin containing a first silane coupling agent, which can be incorporated into a resin skeleton, and a second silane coupling agent, which cannot be incorporated into a resin skeleton; the first silane coupling agent may contain a compound having a methoxy group, and the second silane coupling agent may contain a compound having an ethoxy group.

In the optical fiber, the first silane coupling agent and the second silane coupling agent are contained in the ultraviolet-curable resin, which forms the primary layer, and where A is a value obtained by multiplying a molar concentration of the first silane coupling agent by a number of alkoxyl groups existing in one molecule of the first silane coupling agent, B is a value obtained by multiplying a molar concentration of the second silane coupling agent by a number of alkoxyl groups existing in one molecule of the second silane coupling agent, and C is a water absorption rate of the secondary layer, a point plotted on a two-dimensional coordinate [(horizontal, and vertical axes)=(C, A+B)] may be presented within an area defined by the four points, P1-P4, in which P1: (C, A+B)= (1.6, 0.1), P2: (C, A+B)=(1.6, 0.4), P3: (C, A+B)=(2.9, 0.8), and P4: (C, A+B)=(2.9, 0.25); and maybe A≥0.01, and B≥0.01.

In the optical fiber, wherein the point plotted may be presented within an area defined by the four points, P5-P8, in which P5: (C, A+B)=(1.6, 0.1), P6: (C, A+B)=(1.6, 0.22), P7: (C, A+B)=(2.9, 0.42), and P8: (C, A+B)=(2.9, 0.25); and maybe A≥0.01, and B≥0.01.

In the optical fiber, the second silane coupling agent may be tetraethoxysilane.

In the optical fiber, the first silane coupling agent may have a radical-polymerizable reactive group and one or more methoxy group(s).

In the optical fiber, the second silane coupling agent may not have any radical-polymerizable reactive groups, but may have one or more ethoxy group(s).

In the optical fiber, the water absorption rate of the secondary layer may fall within the range of 1.5-3.0%.

In the optical fiber, a content of the first silane coupling agent may be 0.05-10 wt % of the ultraviolet-curable resin composition after curing, which forms the primary layer.

In the optical fiber, a content of the second silane coupling agent may be 0.05-10 wt % of the ultraviolet-curable resin composition after curing, which forms the primary layer.

In one aspect of the present invention, close contact between a bare optical fiber and a primary layer is stably maintained in an optical fiber core, even if the optical fiber core is used under an environment in which it has been exposed to water. Accordingly, projection of the bare optical fiber resulting from age deterioration and increase of transmission loss of the optical fiber can be suppressed.

DETAILED DESCRIPTION OF THE PREFERRED EMBODIMENTS

Hereinafter, embodiments of the present invention will be explained by reference to the figures.

Figure 1:
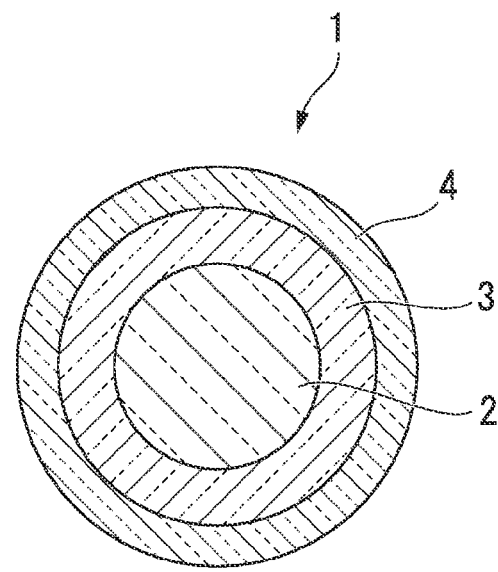
FIG. 1 shows a cross-sectional view of an optical fiber core of the present invention.

FIG. 1 is a cross-sectional view illustrating a structure of the optical fiber core used in embodiments of the present invention.

An optical fiber core 1 according to an embodiment of the present invention is produced by laminating a primary layer 3 and a secondary layer 4 on a bare optical fiber 2, in which the primary layer 3 and the secondary layer 4 consist of an ultraviolet-curable resin.

A known bare optical fiber made of fused silica is used as the bare optical fiber 2, and the bare optical fiber consists of a core which composes a center portion, and a clad covering around the core. Note that FIG. 1 does not show an interface between the core and the clad.

<<Primary Layer 3>>
[Silane Coupling Agent]

The primary layer 3 is produced by curing an ultraviolet-curable resin composition containing a first silane coupling agent (S1), which can be incorporated into a resin skeleton, and a second silane coupling agent (S2), which cannot be incorporated into a resin skeleton, on the bare optical fiber 2.

The first silane coupling agent (S1), which can be incorporated into the resin skeleton, has a radical-polymerizable reactive group (Y) and one or more methoxy group(s). For example, the first silane coupling agent (S1) represented by the Chemical Formula (1) below is preferable.

Chemical Formula (1):

$$Y-Si(R_n)_m(OCH_3)_{3-m} \quad (1)$$

wherein Y represents a radical-polymerizable reactive group, m represents integers of 0-2, n represents an integer of 1 or 2, and $R_n$ ($R_1$ and $R_2$) represents a hydrocarbon group.

The m is preferably 0 or 1, and is more preferably 0.

The hydrocarbon group represented by the $R_n$ ($R_1$ and $R_2$) is independently an aliphatic hydrocarbon group or an aromatic hydrocarbon group, and an example of the hydrocarbon group is a hydrocarbon group having 1-6 of carbon atom(s). Examples of the aliphatic hydrocarbon group include a straight-chain alkyl group, a branched-chain alkyl group, and a monocyclic cycloalkyl group. Among them, a methyl group, ethyl group, methyl chloride group, and cyclohexyl group are preferable, and a methyl group and ethyl group are more preferable. An example of the aromatic hydrocarbon group is a phenyl group.

Preferably, the $R_n$ ($R_1$ and $R_2$) is independently a methyl group or ethyl group, and a methyl group is more preferable. Due to high-reactivity of a methoxy group which is bound to Si in the first silane coupling agent (S1), the methoxy group is easily hydrolyzed under the presence of water molecules, and then reacts with a hydroxyl group on a surface of a bare glass fiber to form a siloxane bond (Si—O—Si). As a result, Si in the bare glass fiber and a resin skeleton in which the radical-polymerizable reactive group (Y) is incorporated are cross-linked through Si in the first silane coupling agent (S1).

The radical-polymerizable reactive group (Y) is not limited to a particular one as long as it is incorporated into a skeleton (main chain) of an ultraviolet-curable resin, which composes the primary layer 3, and a preferred example is an unsaturated hydrocarbon group. More particularly, examples of the radical-polymerizable reactive group (Y) include a (meth)acryloxy group and vinyl group.

The second silane coupling agent (S2), which cannot be incorporated into the resin skeleton, does not have any radical-polymerizable reactive groups (Y), but has one or more ethoxy group(s). An example of the second silane coupling agent (S2) is represented by the Chemical Formula (2) below.

Chemical Formula (2):

$$Si(R_j)_k(OC_2H_6)_{4-k} \quad (2)$$

wherein k represents integers of 0-3, j represents integers of 3-5, and $R_j$ ($R_3$-$R_5$) represents a hydrocarbon group.

The k is preferably 0-2, more preferably 0 or 1, and still more preferably 0. When the k is 0, the second silane coupling agent (S2) is tetraethoxysilane.

The hydrocarbon group represented by the $R_j$ ($R_3$-$R_5$) is independently an aliphatic hydrocarbon group or an aromatic hydrocarbon group, and an example of the hydrocarbon group is a hydrocarbon group having 1-6 of carbon atom(s). The aliphatic hydrocarbon group is preferably a straight-chain alkyl group, branched-chain alkyl group, and monocyclic cycloalkyl group, more preferably a methyl group, ethyl group, methyl chloride group, and cyclohexyl group, and still more preferably a methyl group and ethyl group. An example of the aromatic hydrocarbon group is a phenyl group.

Preferably, the $R_n$ ($R_3$-$R_5$) is independently a methyl group or ethyl group.

Reactivity of an ethoxy group that is bound to Si in the second silane coupling agent (S2) is lower than that of a methyl group. However, the ethoxy group is hydrolyzed under the presence of water molecules, and then reacts with a hydroxyl group on a surface of a bare glass fiber, a hydroxyl group resulting from hydrolysis of an alkoxyl group in the first silane coupling agent (S1), and/or a hydroxyl group resulting from hydrolysis of an alkoxyl group in the second silane coupling agent (S2) to form a siloxane bond (Si—O—Si). As a result, S1 in the second silane coupling agent (S2) can cross-link between Si in the bare glass fiber and the first silane coupling agent (S1).

As described above, the first silane coupling agent (S1), which can be incorporated into a resin skeleton, has a high-reactive methoxy group, but the second silane coupling agent (S2), which cannot be incorporated into a resin skeleton, has a relatively low-reactive ethoxy group, and thereby close contact between the primary layer 3, which is produced by curing an ultraviolet-curable resin composition containing the silane coupling agents (S1) and (S2), and the bare optical fiber 2 can be stabilized for a long time period. Accordingly, it is possible to improve stability, i.e., to improve water resistance of the optical fiber core 1 according to the embodiment of the present invention, when the optical fiber core 1 is used under an environment in which it has been exposed to water. As a result, when the optical fiber core 1 according to the embodiment of the present invention is used under an environment in which it has been exposed to water, projection of the bare optical fiber resulting from age deterioration and increase of transmission loss of the optical fiber can be suppressed.

A content of the first silane coupling agent (S1) in the ultraviolet-curable resin composition, which forms the primary layer 3 after curing, is preferably 0.05-10 wt %, and is more preferably 0.1-5 wt %. Within the range of above, close contact between the bare glass fiber 2 and the primary layer 3 becomes not only sufficient, but also stable.

A content of the second silane coupling agent (S2) in the ultraviolet-curable resin composition, which forms the primary layer 3 after curing, is preferably 0.05-10 wt %, and is more preferably 0.1-5 wt %. Within the range of above, close contact between the bare glass fiber 2 and the primary layer 3 becomes not only sufficient, but also stable.

A content of the sum of the first and second silane coupling agents, (S1) and (S2), in the ultraviolet-curable resin composition, which forms the primary layer 3 after curing, is preferably 0.1-10 wt %, and is more preferably 0.2-5 wt %. Within the range of above, close contact between the bare glass fiber 2 and the primary layer 3 becomes not only sufficient, but also stable.

Under the following condition α, the first and second silane coupling agents, (S1) and (S2), are preferably contained in the ultraviolet-curable resin composition, which forms the primary layer 3 after curing.

That is, where A is a value obtained by multiplying a molar concentration of the first silane coupling agent (S1) by a number of alkoxyl groups existing in one molecule of the first silane coupling agent (S1), B is a value obtained by multiplying a molar concentration of the second silane coupling agent (S2) by a number of alkoxyl groups existing in one molecule of the second silane coupling agent (S2), and C is a later-mentioned water absorption rate of the secondary layer 4, a point plotted on a two-dimensional coordinate [(horizontal, and vertical axes)=(C, A+B)] is preferably presented within an area defined by the four points, P1-P4. A unit for molar concentration is mol/L, and a unit for water absorption is %. Note that the area defined by the four points, P1-P4, includes lines connecting the four points.

The four points are P1: (C, A+B)=(1.6, 0.1), P2: (C, A+B)=(1.6, 0.4), P3: (C, A+B)=(2.9, 0.8), and P4: (C, A+B)=(2.9, 0.25), with the proviso that A≥0.01, and B≥0.01.

The water absorption rate of the secondary layer 4 is the water absorption rate C below, which is defined by JIS K7209A.

The water absorption rate $C=(w2-w1)/w1 \times 100(\%)$:
wherein w1 is a dry mass (mg) of a test piece before being immersed in water, and w2 is a mass (mg) of the test piece after being immersed in water. To perform the test, a film having a thickness of 35 μm is used as a sample, and the film is immersed in water whose temperature is 60° C. for 24 hrs. The water absorption rate is represented by w2-w1.

Figure 2:
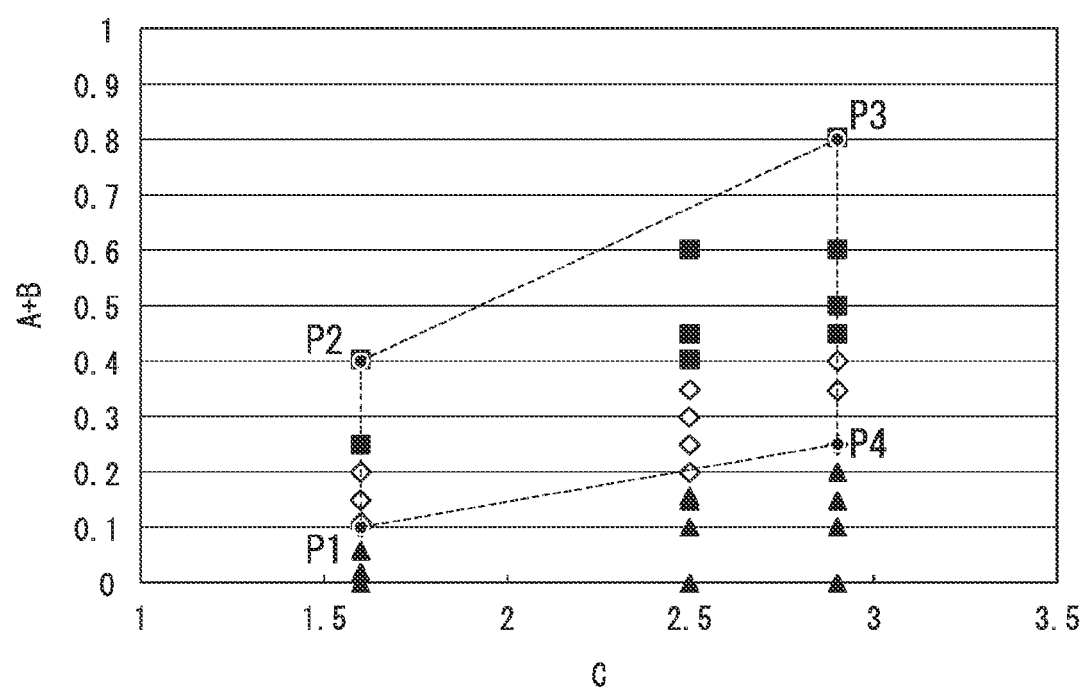
FIG. 2 shows a relationship of the sum of A and B to the water absorption rate C of the secondary layer, in which the value A is obtained by multiplying a molar concentration of a first silane coupling agent (S1) by a number of alkoxyl groups existing in one molecule of the first silane coupling agent (S1), and the value B is obtained by multiplying a molar concentration of a second silane coupling agent (S2) by a number of alkoxyl groups existing in one molecule of the second silane coupling agent (S2).

In the two-dimensional coordinate of the FIG. 2, the area defined by the four points, P1-P4, is shown as the area surrounded by the broken lines. By adjusting each of a value A obtained by multiplying a molar concentration of the first silane coupling agent (S1) by a number of alkoxyl groups existing in one molecule of the first silane coupling agent (S1), a value B obtained by multiplying a molar concentration of the second silane coupling agent (S2) by a number of alkoxyl groups existing in one molecule of the second silane coupling agent (S2), and C, which is a water absorption rate of the secondary layer 4, so that the point plotted is included within the area, close contact between the primary layer 3 and the bare optical fiber 2 can be stabilized for a long time period. Accordingly, it is possible to further improve stability, i.e., to further improve water resistance of the optical fiber core 1 according to the embodiment of the present invention, when the optical fiber core 1 is used under an environment in which it has been exposed to water. As a result, when the optical fiber core 1 according to the embodiment of the present invention is used under an environment in which it has been exposed to water, projection of the bare optical fiber resulting from age deterioration and increase of transmission loss of the optical fiber can be sufficiently suppressed.

Under the following condition β, the first and second silane coupling agents, (S1) and (S2), are more preferably contained in the ultraviolet-curable resin composition, which forms the primary layer 3 after curing.

That is, where A is a value obtained by multiplying a molar concentration of the first silane coupling agent (S1) by a number of alkoxyl groups existing in one molecule of the first silane coupling agent (S1), B is a value obtained by multiplying a molar concentration of the second silane coupling agent (S2) by a number of alkoxyl groups existing in one molecule of the second silane coupling agent (S2), and C is a later-mentioned water absorption rate of the secondary layer 4, a point plotted on a two-dimensional coordinate [(horizontal, and vertical axes)=(C, A+B)] is more preferably presented within an area defined by the four points, P5-P8. A unit for molar concentration is mol/L, and a unit for water absorption is %. Note that the area defined by the four points, P5-P8, includes lines connecting the four points.

The four points are P5: (C, A+B)=(1.6, 0.1), P6: (C, A+B)=(1.6, 0.22), P7: (C, A+B)=(2.9, 0.42), and P8: (C, A+B)=(2.9, 0.25), with the proviso that A≥0.01, and B≥0.01.

Figure 3:
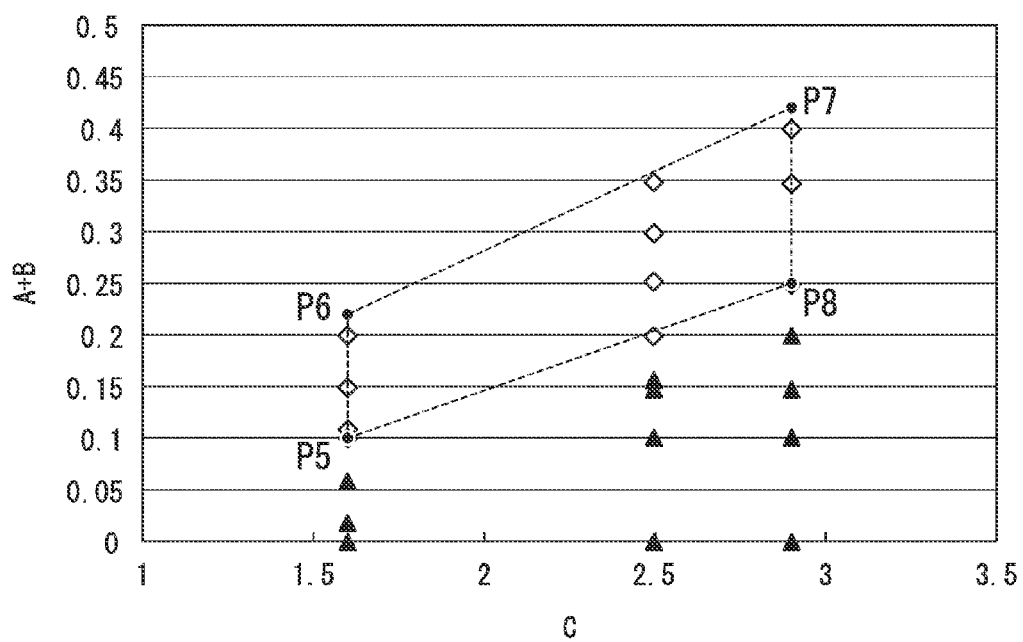
FIG. 3 is another figure showing a relationship of the sum of A and B to the water absorption rate C of the secondary layer, in which the value A is obtained by multiplying a molar concentration of a first silane coupling agent (S1) by a number of alkoxyl groups existing in one molecule of the first silane coupling agent (S1), and the value B is obtained by multiplying a molar concentration of a second silane coupling agent (S2) by a number of alkoxyl groups existing in one molecule of the second silane coupling agent (S2).

In the two-dimensional coordinate of the FIG. 3, the area defined by the four points, P5-P8, is shown as the area surrounded by the broken lines. By adjusting each of A, which is a molar concentration of the first silane coupling agent (S1), B, which is a molar concentration of the second silane coupling agent (S2), and C, which is a water absorption rate of the secondary layer 4, so that the point plotted is included within the area, close contact between the primary layer 3 and the bare optical fiber 2 can be stabilized for a long time period. Accordingly, it is possible to further improve stability, i.e., to further improve water resistance of the optical fiber core 1 according to the embodiment of the present invention, when the optical fiber core 1 is used under an environment in which it has been exposed to water. As a result, when the optical fiber core 1 according to the embodiment of the present invention is used under an environment in which it has been exposed to water, projection of the bare optical fiber resulting from age deterioration and increase of transmission loss of the optical fiber can be sufficiently suppressed. Moreover, excessively close contact (adhesion) between the bare optical fiber 2 and the primary layer 3 can be prevented prior to laying down the optical fiber core 1 in an environment for its usage, and thereby a covering can be easily removed, that is, the primary layer 3 and the secondary layer 4 can be easily peeled off from the bare optical fiber 2, during an operation for laying down.

When the ultraviolet-curable resin composition is cured on the bare optical fiber 2, close contact between the bare optical fiber 2 and the primary layer 3 can be favorable if a reaction between the first and second silane coupling agents, (S1) and (S2), which are contained in the ultraviolet-curable resin composition, and fused silica, which composes the bare optical fiber 2, progresses appropriately. Three types of reactions between the silane coupling agents and fused silica include the following (A)-(C):

(A) A reaction between the first silane coupling agent (S1), which can be incorporated into a resin skeleton, and fused silica;

(B) A reaction between the second silane coupling agent (S2), which cannot be incorporated into a resin skeleton, and fused silica;

(C) A reaction between the second silane coupling agent (S2), which cannot be incorporated into a resin skeleton, and both the first silane coupling agent (S1), which can be incorporated into a resin skeleton, and fused silica.

Binding strength of each of the reaction types (A)-(C) seems to be varied. In an embodiment of the present invention, the first and second silane coupling agents, (S1) and (S2), are used in combination to finely balance these three kinds of binding strength, so that close contact between the bare optical fiber 2 and the primary layer 3 can be stabilized for a long time period. As a result, when the optical fiber core 1 according to the embodiment of the present invention is used under an environment in which it has been exposed to water, it is possible to improve stability of the close contact; and projection of the bare optical fiber 2 resulting from age deterioration and increase of transmission loss of the optical fiber can be suppressed.

As described above, when the optical fiber core 1 is used under an environment in which it has been exposed to water, a rate of delivering water to the primary layer 3 can be settled within a given range by applying the conditions α and β, which show relationships between the water absorption rate C of the secondary layer 4 and molar concentrations A and B, in which each of A and B is for each of the silane coupling agents in the primary layer 3. As a result, water delivered to the primary layer 3 hydrolyzes the silane coupling agents in the primary layer 3, and thereby close contact between the primary layer 3 and the bare optical fiber 2 seems to be gradually increased during use. On the other hand, due to age deterioration, the close contact between the primary layer 3 and the bare optical fiber 2 is gradually decreased during use.

Thus, when the optical fiber core 1 is used under an environment in which it has been exposed to water, the close contact will be changed to the opposite two directions, and the close contact seems to be stabilized for a long time period by canceling such two changes to each other.

[Ultraviolet-Curable Resin]

The ultraviolet-curable resin composition, which forms the primary layer 3 after curing, contains at least the first and second silane coupling agents, (S1) and (S2), a resin component (resin skeleton), and a photopolymerization initiator.

An oligomer having a known unsaturated polymerizable group, in which polymerization of the polymerizable group may be initiated by irradiation of ultraviolet light (or infrared light, visible light, X-ray, electron beam, gamma-ray and the like) (hereinafter, occasionally referred to as unsaturated polymerizable oligomer) can be used as the resin component. In addition, a monomer having an unsaturated polymerizable group (hereinafter, occasionally referred to as unsaturated polymerizable monomer) can be added as the resin component.

Preferably, the oligomer is urethane acrylate oligomer.

The unsaturated polymerizable monomer may either be monofunctional unsaturated polymerizable monomer or polyfunctional unsaturated polymerizable monomer. Among them, acrylate monomer and vinyl monomer are preferable.

An example of the urethane acrylate oligomers is urethane (meth)acrylate. An applicable known urethane (meth)acrylate is the one obtained by reacting polyhydric alcohol and organic polyisocyanate with a (meth)acrylate compound having a hydroxyl group.

Examples of the polyhydric alcohol include aliphatic polyhydric alcohols, such as neopentyl glycol, 3-methyl-1,5-pentanediol, ethylene glycol, propylene glycol, 1,4-butanediol, 1,6-hexanediol, trimethylolpropane, pentaerythritol, tricyclodecanedimethylol, bis(hydroxymethyl)cyclohexane and the like.

Examples of the organic polyisocyanate include aliphatic diisocyanates, such as hexamethylene diisocyanate, pentamethylene diisocyanate, propylene diisocyanate, butylene diisocyanate and the like; and alicyclic diisocyanates, such as cyclohexane diisocyanate, methylene bis(cyclohexyl isocyanate), isophorone diisocyanate and the like.

Examples of the (meth)acrylate having a hydroxyl group include 2-hydroxyethyl (meth)acrylate, 2-hydroxypropyl (meth)acrylate, 1,4-butanediol mono(meth)acrylate, a reactant between 2-hydroxyethyl (meth)acrylate and ε-caprolactone, 2-hydroxy-3-phenyloxypropyl (meth)acrylate, pentaerythritol tri(meth)acrylate, glycerin di(meth)acrylate and the like. Among them, (meth)acrylate having 1-4 of carbon atom(s), such as 2-hydroxyethyl (meth)acrylate, 2-hydroxypropyl (meth)acrylate or the like is preferable.

Examples of the monofunctional unsaturated polymerizable monomer include (meth)acrylate having an alicyclic structure, such as isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, 4-butylcyclohexyl (meth)acrylate and the like; (meth)acrylate having an aromatic structure, such as benzyl (meth)acrylate and the like; compounds, such as acryloyl morpholine, 2-hydroxyethyl (meth)acrylate, 2-hydroxypropyl (meth)acrylate, 2-hydroxybutyl (meth)acrylate, 2-hydroxy-3-phenoxypropyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, phenoxyethyl (meth)acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxypolypropylene glycol (meth)acrylate, hydroxybutyl vinyl ether, lauryl vinyl ether, cetyl vinyl ether, 2-ethylhexyl vinyl ether and the like; and lactam having a vinyl group, such as N-vinylpyrrolidone, N-vinylcaprolactam and the like.

Examples of the polyfunctional unsaturated polymerizable monomer include trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropane trioxyethyl (meth)acrylate, tris (2-hydroxyethyl)isocyanurate tri(meth)acrylate, tris(2-hydroxyethyl)isocyanurate di(meth)acrylate, tricyclodecane dimethanol di(meth)acrylate, diol di(meth)acrylate in which the diol is ethylene oxide adduct or propylene oxide adduct of bisphenol A, diol di(meth)acrylate in which the diol is ethylene oxide adduct or propylene oxide adduct of hydrogenated bisphenol A, epoxy di(meth)acrylate in which (meth)acrylate is added to diglycidyl ether of bisphenol A, triethylene glycol divinyl ether and the like.

A content of the unsaturated polymerizable oligomer in the ultraviolet-curable resin composition is 10-90 wt %, preferably 20-85 wt %.

The unsaturated polymerizable oligomer is preferably urethane acrylate oligomer.

The photopolymerization initiator is not particularly limited as long as it can polymerize the unsaturated polymerizable compound under irradiation of ultraviolet light or the like. Examples of the photopolymerization initiator include 1-hydroxycyclohexyl phenyl ketone, 2,2-dimethoxy-2-phenylacetophenone, xanthone, fluorenone, benzaldehyde, florene, anthraquinone, carbazole, 3-methylacetophenone, 4-chlorobenzophenone, 4,4'-dimethoxybenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethyl thioxanthone, 2-isopropyl thioxanthone, 2-chlorothioxanthone, 2-methyl-1-[4-(methylthio) phenyl]-2-morpholino-propan-1-one, 2,4,6-trimethylbenzoyl diphenylphosphine oxide, bis-(2,6-dimethoxybenzoyl)-2,4,4-trimethylpentylphosphine oxide and the like.

Although a content of the photopolymerization initiator in the ultraviolet-curable resin composition depends on types and a content of the unsaturated polymerizable compound, it is preferably 0.01-10 wt %, and is more preferably 0.1-4 wt %.

In addition to the above, various additives are used in the ultraviolet-curable resin composition. For example, antioxidant, colorant, ultraviolet absorber, light stabilizer, thermal polymerization inhibitor, leveling agent, surfactant, preservative/stabilizer, plasticizer, lubricant, solvent, filler, age resistor, wettability modifier and the like can be added as desired.

A thickness of the primary layer 3 is preferably within the range of 20-40 μm. Within the range, close contact between the bare optical fiber 2 and the primary layer 3 is sufficient.

<<Secondary Layer 4>>
[Ultraviolet-Curable Resin]

The secondary layer 4 is produced by curing an ultraviolet-curable resin composition on the primary layer 3. The ultraviolet-curable resin composition contains at least a resin component (resin skeleton) and a photopolymerization initiator.

The resin components and photopolymerization initiators represented for the primary layer 3 can also be applied to the secondary layer 4. Types and contents of unsaturated polymerizable oligomers and unsaturated polymerizable monomers in the resin component are determined by considering the water absorption rate C of the secondary layer 4, resin hardness, hardenability, durability and the like, and then the unsaturated polymerizable oligomers and unsaturated polymerizable monomers are used in combination. Among them, urethane acrylate oligomer is preferable.

Other additives explained for the primary layer 3 can also be added to the ultraviolet-curable resin composition, which forms the secondary layer 4 after curing, as desired.

The water absorption rate C of the secondary layer 4 is preferably 1.5-3.0%, and is more preferably 1.6-2.9%. When the secondary layer 4 is used with the aforementioned primary layer 3 within the range, effects of the present invention become sufficient. The definition of the water absorption rate C is already described above.

To determine the water absorption rate C of the secondary layer 4 as desired, known methods to determine types and contents of base resins in the ultraviolet-curable resin composition, which forms the secondary layer 4, can be utilized. For example, the method described in the Japanese Unexamined Patent Application, First Publication No. 2007-334111 or the like can be utilized.

A thickness of the secondary layer 4 is preferably within the range of 20-40 μm. Within the range, close contact between the primary layer 3 and the secondary layer 4 is sufficient, and thereby durability is sufficient.

EXAMPLES

Hereinafter, examples will be described to explain embodiments of the present invention more specifically; however, the present invention is not limited to the examples.

Example 1

<Manufacturing an Optical Fiber Core>

Firstly, an optical fiber base material composed mostly of fused silica was mounted axially and movably in a spinning furnace. Melt spinning was performed by heating a bottom part of the optical fiber base material to about 2000° C. under an inert gas atmosphere, such as under an argon or helium atmosphere, then cooled to obtain a bare optical fiber.

An ultraviolet-curable resin composition described below, which contains the first and second silane coupling agents, (S1) and (S2), was evenly coated on the circumference of the bare optical fiber (whose diameter is 125 μm), and was cured by UV irradiation to form a primary layer (whose diameter is 190 μm, and thickness is 32.5 μm). In addition, another ultraviolet-curable resin composition was evenly coated on the circumference of the primary layer, and was cured by UV irradiation to form a secondary layer (whose diameter is 245 μm, and thickness is 27.5 μm), and thereby an optical fiber core was obtained.

<<Silane Coupling Agent>>

The ultraviolet-curable resin composition was made to contain 0.8 wt % of 3-methacryloxypropyltrimethoxysilane (molecular weight: 248) as a first silane coupling agent (S1), which can be incorporated into a resin skeleton. The value A obtained by multiplying a molar concentration of the first silane coupling agent (S1) by a number of alkoxyl groups existing in one molecule is calculated as 0.033 (mol/L)× 3=0.1.

The ultraviolet-curable resin composition was made to contain 0.5 wt % of tetraethoxysilane (molecular weight: 208) as a second silane coupling agent (S2), which cannot be incorporated into a resin skeleton. The value B obtained by multiplying a molar concentration of the second silane coupling agent (S2) by a number of alkoxyl groups existing in one molecule is calculated as 0.025 (mol/L)×4=0.1.

<<Ultraviolet-Curable Resin Composition>>

An ultraviolet-curable resin composition to form the primary layer was prepared by mixing the first and second silane coupling agents, (S1) and (S2), a base resin {urethane acrylate oligomer (80 parts by weight), acrylate monomer (10 parts by weight), and vinyl monomer (10 parts by weight)}, and a photopolymerization initiator (1.5 parts by weight).

An ultraviolet-curable resin composition to form the secondary layer was prepared by mixing a base resin {urethane acrylate oligomer (70 parts by weight) and acrylate monomer (30 parts by weight)} and a photopolymerization initiator (1.5 parts by weight), without the first and second silane coupling agents, (S1) and (S2). A water absorption rate C of the secondary layer was adjusted to 1.6.

The water absorption rate C of the secondary layer was measured by using a specially made test film, and by following the method compliant with the JIS K7209 "Plastics—Determination of water absorption." The test film was prepared by coating the ultraviolet-curable resin composition, which forms the secondary layer, on an acrylic plate by using a spin coater, and then curing the ultraviolet-curable resin composition.

<Evaluation of the Optical Fiber Core>

The manufactured optical fiber core was evaluated for increase of transmission loss, projection of bare optical fiber, and removability of covering.

After immersing the manufactured optical fiber core in warm water whose temperature is 60° C. for one month, increase of transmission loss was measured with light at 1.55 µm. As a result, increase of transmission loss of the optical fiber core was less than or equal to 0.01 dB/km.

After immersing the manufactured optical fiber core (100 m in length) in warm water whose temperature is 60° C. for one month, projection of the bare optical fiber was evaluated as follows: "G" means where projection length of the bare optical fiber at the end of the optical fiber core is less than 1 mm, and "F" means where the projection length is 1 mm or greater. As a result, projection of the bare optical fiber in this optical fiber core was evaluated as "G."

After covering of the manufactured optical fiber core was removed, an amount of resin residues remaining on the bare glass fiber was checked visually, and thereby the removability of covering was evaluated. In the evaluation, "G" means that resin residues remained only on a portion of the bare glass fiber, or no resin residues remained on the bare glass fiber, and "F" means that resin residues remained on an almost whole surface of the bare glass fiber. As a result, removability of covering of the bare optical fiber in this optical fiber core was evaluated as "G."

The three results of the above are shown in Table 2.

Optical fiber cores were manufactured by the same method described above, except that each of the values A and B was independently altered within the range of 0-0.2, by altering a content of the first and second silane coupling agents, (S1) and (S2), in the ultraviolet-curable resin, which forms the primary layer. Each of the obtained optical fiber cores was evaluated by the same method described above. The results are shown in Tables 1 and 2.

In Tables 1 and 2, the evaluation for each of the optical fiber cores is represented in the order of "increase of transmission loss (dB/km)/projection of bare optical fiber/removability of covering."

TABLE 1

|   |      | B       |           |           |
|---|------|---------|-----------|-----------|
|   |      | 0       | 0.01      | 0.05      |
| A | 0    | 0.73/F/G | —        | —         |
|   | 0.01 | —       | 0.07/G/G  | 0.06/G/G  |
|   | 0.05 | —       | 0.06/G/G  | ≤0.01/G/G |
|   | 0.1  | —       | ≤0.01/G/G | ≤0.01/G/G |
|   | 0.15 | —       | —         | ≤0.01/G/G |
|   | 0.2  | 0.19/F/G | —        | ≤0.01/G/F |

* Water absorption rate C of the secondary layer is 1.6.

TABLE 2

|   |      | B         |           |           |
|---|------|-----------|-----------|-----------|
|   |      | 0.1       | 0.15      | 0.2       |
| A | 0    | —         | —         | 0.26/G/G  |
|   | 0.01 | ≤0.01/G/G | —         | —         |
|   | 0.05 | ≤0.01/G/G | ≤0.01/G/G | ≤0.01/G/F |
|   | 0.1  | ≤0.01/G/G | ≤0.01/G/F | —         |
|   | 0.15 | ≤0.01/G/F | —         | —         |
|   | 0.2  | —         | —         | ≤0.01/G/F |

* Water absorption rate C of the secondary layer is 1.6.

The results from Tables 1 and 2 were plotted on a two-dimensional coordinate in which the horizontal axis represents a water absorption rate C of the secondary layer, and the vertical axis represents the sum of the values A and B (See FIGS. 2 and 3).

For the points plotted in FIG. 2, "◊" represents points evaluated as "≤0.01/G/G," "■" represents points evaluated as "≤0.01/G/F," and "▲" represents points evaluated in which the increase of transmission loss is over 0.01 dB/km.

For the points plotted in FIG. 3, "◊" represents points evaluated as "≤0.01/G/G," and "▲" represents points evaluated in which the increase of transmission loss is over 0.01 dB/km; however, points evaluated as "≤0.01/G/F" are not shown.

Example 2

Optical fiber cores were manufactured by the same method as that described in Example 1, except that the first silane coupling agent (S1), which can be incorporated into a resin skeleton, was changed to vinyltrimethoxysilane (molecular weight: 148). That is, by using vinyltrimethoxysilane as the first silane coupling agent (S1), optical fiber cores in which each of the values A and B was independently altered within the range of 0-0.2 were manufactured in the same manner described in Example 1. Each of the obtained optical fiber cores was evaluated by the same method described in Example 1. The results are shown in Table 3.

In Table 3, the evaluation for each of the optical fiber cores is represented in the order of "increase of transmission loss (dB/km)/projection of bare optical fiber/removability of covering."

TABLE 3

|   |      | B        |           |           |           |           |
|---|------|----------|-----------|-----------|-----------|-----------|
|   |      | 0        | 0.05      | 0.1       | 0.15      | 0.2       |
| A | 0    | 0.73/F/G | —         | —         | —         | 0.26/G/G  |
|   | 0.05 | —        | ≤0.01/G/G | ≤0.01/G/G | ≤0.01/G/G | ≤0.01/G/F |
|   | 0.1  | —        | ≤0.01/G/G | ≤0.01/G/G | ≤0.01/G/F | —         |
|   | 0.15 | —        | ≤0.01/G/G | ≤0.01/G/F | —         | —         |
|   | 0.2  | 0.21/F/G | ≤0.01/G/F | —         | —         | —         |

* Water absorption rate C of the secondary layer is 1.6.

In addition to the results from Tables 1 and 2, the results from Table 3 were also plotted on the two-dimensional coordinate in which the horizontal axis represents a water absorption rate C of the secondary layer, and the vertical axis represents the sum of the values A and B (See FIGS. 2 and 3).

For the points plotted in FIG. 2, "◊" represents points evaluated as "≤0.01/G/G," "■" represents points evaluated as "≤0.01/G/F," and "▲" represents points evaluated in which the increase of transmission loss is over 0.01 dB/km.

For the points plotted in FIG. 3, "◊" represents points evaluated as "≤0.01/G/G," and "▲" represents points evaluated in which the increase of transmission loss is over 0.01 dB/km; however, points evaluated as "≤0.01/G/F" are not shown.

Example 3

Optical fiber cores were manufactured by the same method as described in Example 1, except that the second silane coupling agent (S2), which cannot be incorporated into a resin skeleton, was changed to methyltriethoxysilane (molecular weight: 178). That is, by using methyltriethoxysilane as the second silane coupling agent (S2), optical fiber cores in which each of the values A and B was independently altered within the range of 0-0.2 were manufactured in the same manner described in Example 1. Each of the obtained optical fiber cores was evaluated by the same method described in Example 1. The results are shown in Table 4.

In Table 4, the evaluation for each of the optical fiber cores is represented in the order of "increase of transmission loss (dB/km)/projection of bare optical fiber/removability of covering."

TABLE 4

|   |      | B          |           |           |           |           |
|---|------|------------|-----------|-----------|-----------|-----------|
|   |      | 0          | 0.05      | 0.1       | 0.15      | 0.2       |
| A | 0    | 0.73/F/G   | —         | —         | —         | 0.33/G/G  |
|   | 0.05 | —          | ≤0.01/G/G | ≤0.01/G/G | ≤0.01/G/G | ≤0.01/G/F |
|   | 0.1  | —          | ≤0.01/G/G | ≤0.01/G/G | ≤0.01/G/F | —         |
|   | 0.15 | —          | ≤0.01/G/G | ≤0.01/G/F | —         | —         |
|   | 0.2  | 0.21/F/G   | ≤0.01/G/F | —         | —         | —         |

* Water absorption rate C of the secondary layer is 1.6.

In addition to the results from Tables 1-3, the results from Table 4 were also plotted on the two-dimensional coordinate in which the horizontal axis represents a water absorption rate C of the secondary layer, and the vertical axis represents the sum of the values A and B (See FIGS. 2 and 3).

For the points plotted in FIG. 2, "◇" represents points evaluated as "≤0.01/G/G," "■" represents points evaluated as "≤0.01/G/F," and "▲" represents points evaluated in which the increase of transmission loss is over 0.01 dB/km.

For the points plotted in FIG. 3, "◇" represents points evaluated as "≤0.01/G/G," and "▲" represents points evaluated in which the increase of transmission loss is over 0.01 dB/km; however, points evaluated as "≤0.01/G/F" are not shown.

Example 4

An ultraviolet-curable resin composition, which forms the secondary layer, was prepared so that a water absorption rate C of the secondary layer becomes 2.5. For the preparation, a base resin {urethane acrylate oligomer (65 parts by weight), acrylate monomer (35 parts by weight), and vinyl monomer (10 parts by weight)} and a photopolymerization initiator (1.5 parts by weight) were mixed.

Optical fiber cores were manufactured by the same method as that described in Example 1, except that the water absorption rate C of the secondary layer was changed to 2.5. That is, optical fiber cores in which each of the values A and B was independently altered within the range of 0-0.2 were manufactured in the same manner described in Example 1. Each of the obtained optical fiber cores was evaluated by the same method described in Example 1. The results are shown in Tables 5 and 6.

In Tables 5 and 6, the evaluation for each of the optical fiber cores is represented in the order of "increase of transmission loss (dB/km)/projection of bare optical fiber/removability of covering."

TABLE 5

|   |      | B        |           |           |           |
|---|------|----------|-----------|-----------|-----------|
|   |      | 0        | 0.05      | 0.1       | 0.15      |
| A | 0    | 0.52/F/G | —         | —         | —         |
|   | 0.05 | —        | —         | 0.09/G/G  | ≤0.01/G/G |

TABLE 5-continued

|   |      | B        |           |           |           |
|---|------|----------|-----------|-----------|-----------|
|   |      | 0        | 0.05      | 0.1       | 0.15      |
|   | 0.1  | —        | —         | 0.06/G/G  | ≤0.01/G/G |
|   | 0.15 | —        | ≤0.01/G/G | —         | —         |
|   | 0.2  | —        | ≤0.01/G/G | ≤0.01/G/G | ≤0.01/G/G |
|   | 0.3  | 0.18/F/G | ≤0.01/G/G | ≤0.01/G/G | ≤0.01/G/F |
|   | 0.4  | —        | ≤0.01/G/F | —         | —         |

* Water absorption rate C of the secondary layer is 2.5.

TABLE 6

|   |      | B         |           |           |
|---|------|-----------|-----------|-----------|
|   |      | 0.2       | 0.3       | 0.4       |
| A | 0    | —         | 0.20/G/G  | —         |
|   | 0.05 | ≤0.01/G/G | ≤0.01/G/G | ≤0.01/G/F |
|   | 0.1  | —         | ≤0.01/G/F | —         |
|   | 0.15 | ≤0.01/G/G | ≤0.01/G/F | —         |
|   | 0.2  | ≤0.01/G/F | —         | —         |
|   | 0.3  | —         | ≤0.01/G/F | —         |
|   | 0.4  | —         | —         | —         |

* Water absorption rate C of the secondary layer is 2.5.

In addition to the results from Tables 1-4, the results from Tables 5 and 6 were also plotted on the two-dimensional coordinate in which the horizontal axis represents a water absorption rate C of the secondary layer, and the vertical axis represents the sum of the values A and B (See FIGS. 2 and 3).

For the points plotted in FIG. 2, "◇" represents points evaluated as "≤0.01/G/G," "■" represents points evaluated as "≤0.01/G/F," and "▲" represents points evaluated in which the increase of transmission loss is over 0.01 dB/km.

For the points plotted in FIG. 3, "◇" represents points evaluated as "≤0.01/G/G," and "▲" represents points evaluated in which the increase of transmission loss is over 0.01 dB/km; however, points evaluated as "≤0.01/G/F" are not shown.

Example 5

An ultraviolet-curable resin composition, which forms the secondary layer, was prepared so that a water absorption rate C of the secondary layer becomes 2.9. For the preparation, a base resin {urethane acrylate oligomer (65 parts by weight) and acrylate monomer (35 parts by weight)} and a photopolymerization initiator (1.5 parts by weight) were mixed.

Optical fiber cores were manufactured by the same method as that described in Example 1, except that the water absorption rate C of the secondary layer was changed to 2.9. That is, optical fiber cores in which each of the values A and B was independently altered within the range of 0-0.2 were manufactured in the same manner described in Example 1. Each of the obtained optical fiber cores was evaluated by the same method described in Example 1. The results are shown in Tables 7 and 8.

In Tables 7 and 8, the evaluation for each of the optical fiber cores is represented in the order of "increase of transmission loss (dB/km)/projection of bare optical fiber/removability of covering."

TABLE 7

| | | B | | | |
|---|---|---|---|---|---|
| | | 0 | 0.05 | 0.1 | 0.15 |
| A | 0 | 0.60/F/G | — | — | — |
| | 0.05 | — | — | 0.08/G/G | 0.09/G/G |
| | 0.1 | — | — | 0.05/G/G | ≤0.01/G/G |
| | 0.15 | — | 0.08/G/G | ≤0.01/G/G | — |
| | 0.2 | — | ≤0.01/G/G | — | ≤0.01/G/G |
| | 0.3 | — | ≤0.01/G/G | ≤0.01/G/G | ≤0.01/G/F |
| | 0.4 | 0.15/F/G | ≤0.01/G/F | ≤0.01/G/F | — |

* Water absorption rate C of the secondary layer is 2.9.

TABLE 8

| | | B | | |
|---|---|---|---|---|
| | | 0.2 | 0.3 | 0.4 |
| A | 0 | — | — | 0.24/G/G |
| | 0.05 | ≤0.01/G/G | ≤0.01/G/G | ≤0.01/G/F |
| | 0.1 | — | ≤0.01/G/G | ≤0.01/G/F |
| | 0.15 | ≤0.01/G/G | ≤0.01/G/F | — |
| | 0.2 | ≤0.01/G/G | ≤0.01/G/F | — |
| | 0.3 | ≤0.01/G/F | ≤0.01/G/F | — |
| | 0.4 | — | — | ≤0.01/G/F |

* Water absorption rate C of the secondary layer is 2.9.

In addition to the results from Tables 1-6, the results from Tables 7 and 8 were also plotted on the two-dimensional coordinate in which the horizontal axis represents a water absorption rate C of the secondary layer, and the vertical axis represents the sum of the values A and B (See FIGS. 2 and 3).

For the points plotted in FIG. 2, "◇" represents points evaluated as "≤0.01/G/G," "■" represents points evaluated as "≤0.01/G/F," and "▲" represents points evaluated in which the increase of transmission loss is over 0.01 dB/km.

For the points plotted in FIG. 3, "◇" represents points evaluated as "≤0.01/G/G," and "▲" represents points evaluated in which the increase of transmission loss is over 0.01 dB/km; however, points evaluated as "≤0.01/G/F" are not shown.

Comparative Example 1

Optical fiber cores were manufactured by the same method as that described in Example 1, except that the first silane coupling agent (S1), which can be incorporated into a resin skeleton, was changed to 3-methacryloxypropyltriethoxysilane (molecular weight: 290). That is, by using 3-methacryloxypropyltriethoxysilane as the first silane coupling agent (S1), optical fiber cores in which each of the values A and B was independently altered within the range of 0-0.2 were manufactured in the same manner described in Example 1. Each of the obtained optical fiber cores was evaluated by the same method described in Example 1. The results are shown in Table 9.

In Table 9, the evaluation for each of the optical fiber cores is represented in the order of "increase of transmission loss (dB/km)/projection of bare optical fiber/removability of covering."

TABLE 9

| | | B | | | |
|---|---|---|---|---|---|
| | | 0 | 0.1 | 0.2 | 0.3 |
| A | 0 | — | — | — | — |
| | 0.1 | — | 0.13/G/G | — | — |
| | 0.2 | — | — | 0.14/G/G | — |
| | 0.3 | — | — | — | 0.09/G/G |

* Water absorption rate C of the secondary layer is 1.6.

Comparative Example 2

Optical fiber cores were manufactured by the same method as that described in Example 1, except that the second silane coupling agent (S2), which cannot be incorporated into a resin skeleton, was changed to tetramethoxysilane (molecular weight: 152). That is, by using tetramethoxysilane as the second silane coupling agent (S2), optical fiber cores in which each of the values A and B was independently altered within the range of 0-0.2 were manufactured in the same manner described in Example 1. Each of the obtained optical fiber cores was evaluated by the same method described in Example 1. The results are shown in Table 10.

In Table 10, the evaluation for each of the optical fiber cores is represented in the order of "increase of transmission loss (dB/km)/projection of bare optical fiber/removability of covering."

TABLE 10

| | | B | | | |
|---|---|---|---|---|---|
| | | 0 | 0.1 | 0.2 | 0.3 |
| A | 0 | — | — | — | — |
| | 0.1 | — | 0.22/G/G | — | — |
| | 0.2 | — | — | 0.14/G/G | — |
| | 0.3 | — | — | — | 0.15/G/G |

* Water absorption rate C of the secondary layer is 1.6.

In Table 11, the first silane coupling agent (S1) and the second silane coupling agent (S2) used and water absorption rate C of the secondary layer of the optical fiber core manufactured are indicated for each of the examples and comparative examples individually.

TABLE 11

| | | Example 1 | Example 2 | Example 3 | Example 4 | Example 5 | Comparative Example 1 | Comparative Example 2 |
|---|---|---|---|---|---|---|---|---|
| Silane coupling agent, which can be incorporated into resin skeleton (S1) | 3-methacryloxy propyltrimethoxysilane | ○ | | ○ | ○ | ○ | | ○ |
| | Vinyltrimethoxysilane | | ○ | | | | | |
| | 3-methacryloxy propyltriethoxysilane | | | | | | ○ | |
| Silane coupling | Tetraethoxysilane | ○ | ○ | | ○ | ○ | ○ | |

TABLE 11-continued

| | | Example 1 | Example 2 | Example 3 | Example 4 | Example 5 | Comparative Example 1 | Comparative Example 2 |
|---|---|---|---|---|---|---|---|---|
| agent, which cannot be incorporated into resin skeleton (S2) | Methyltriethoxysilane | | | ○ | | | | |
| | Tetramethoxysilane | | | | | | | ○ |
| Water absorption rate C of secondary layer | 1.6 | ○ | ○ | ○ | | | ○ | ○ |
| | 2.5 | | | | ○ | | | |
| | 2.9 | | | | | ○ | | |

In Table 12, molecular weight, number of alkoxyl groups, one example of content (g) in 1 L of ultraviolet-curable resin composition, concentration of this content (wt %), molar concentration of this content (mol/L), and value represents "number of alkoxyl groups×molar concentration" at this content are shown for each of silane coupling agents individually.

TABLE 12

| | Molecular weight | Number of alkoxyl groups | One example of a content in 1 L (g) | Concentration (wt %) | Molar concentration (mol/L) | Number of alkoxyl groups × Molar concentration |
|---|---|---|---|---|---|---|
| 3-methacryloxy propyltrimethoxysilane | 248 | 3 | 8.27 | 0.8 | 0.033 | 0.1 |
| Vinyltrimethoxysilane | 148 | 3 | 4.93 | 0.5 | 0.033 | 0.1 |
| 3-methacryloxy propyltriethoxysilane | 290 | 3 | 9.67 | 1.0 | 0.033 | 0.1 |
| Tetraethoxysilane | 208 | 4 | 5.20 | 0.5 | 0.025 | 0.1 |
| Methyltriethoxysilane | 178 | 3 | 5.93 | 0.6 | 0.033 | 0.1 |
| Tetramethoxysilane | 152 | 4 | 3.80 | 0.4 | 0.025 | 0.1 |

As is evident from the results above, the optical fiber cores according to the embodiments of the present invention are superior or equivalent to the optical fiber cores according to the comparative examples, as for evaluations of "increase of transmission loss" and "projection of bare optical fiber."

It is also evident that evaluations of "increase of transmission loss" and "projection of bare optical fiber" for the optical fiber cores according to the embodiments of the present invention are sufficiently superior, if the values A and B, and the water absorption rate C, which are plotted on a two-dimensional coordinate [(horizontal, and vertical axes)=(C, A+B)], are presented within an area defined by the four points, P1-P4, in which P1: (C, A+B)=(1.6, 0.1), P2: (C, A+B)=(1.6, 0.4), P3: (C, A+B)=(2.9, 0.8), and P4: (C, A+B)=(2.9, 0.25), with the proviso that A≥0.01, and B≥0.01.

Moreover, it is evident that evaluations of "increase of transmission loss" and "projection of bare optical fiber" for the optical fiber cores according to the embodiments of the present invention are sufficiently superior, and evaluations of "removability of covering" for those optical fiber cores are also superior, if the values A and B, and the water absorption rate C, which are plotted on a two-dimensional coordinate [(horizontal, and vertical axes)=(C, A+B)], are presented within an area defined by the four points, P5-P8, in which P5: (C,A+B)=(1.6, 0.1), P6: (C,A+B)=(1.6, 0.22), P7: (C,A+B)=(2.9, 0.42), and P8: (C, A+B)=(2.9, 0.25), with the proviso that A≥0.01, and B≥0.01.

The optical fiber core of the present invention is utilized for information and communication, and can be applicable to all types of optical fibers, such as single-mode fiber, dispersion-shifted fiber and the like. The optical fiber core of the present invention can also be applicable as an optical component.

What is claimed is:

1. An optical fiber core comprising a primary layer and a secondary layer, which are laminated on a bare optical fiber, wherein
    the primary layer is formed by curing an ultraviolet-curable resin composition containing a first silane coupling agent, which can be incorporated into a resin skeleton, and a second silane coupling agent, which cannot be incorporated into a resin skeleton,
    the first silane coupling agent contains a compound having a methoxy group,
    the second silane coupling agent contains a compound having an ethoxy group,
    the first silane coupling agent and the second silane coupling agent are contained in the ultraviolet-curable resin composition, which forms the primary layer, and
    where A is a value obtained by multiplying a molar concentration of the first silane coupling agent by a number of alkoxyl groups existing in one molecule of the first silane coupling agent, B is a value obtained by multiplying a molar concentration of the second silane coupling agent by a number of alkoxyl groups existing in one molecule of the second silane coupling agent, and C is a water absorption rate of the secondary layer,
    a point plotted on a two-dimensional coordinate [(horizontal, and vertical axes)=(C, A+B)] is presented within an area defined by the four points, P1-P4, in which P1: (C, A+B)=(1.6, 0.1), P2: (C, A+B)=(1.6, 0.4), P3: (C, A+B)=(2.9, 0.8), and P4: (C, A+B)=(2.9, 0.25); and A≥0.01, and B≥0.01.

2. The optical fiber core according to claim 1, wherein the point plotted is presented within an area defined by the four points, P5-P8, in which P5: (C, A+B)=(1.6, 0.1), P6: (C, A+B)=(1.6, 0.22), P7: (C, A+B)=(2.9, 0.42), and P8: (C, A+B)=(2.9, 0.25); and A≥0.01, and B≥0.01.

3. The optical fiber core according to claim 1, wherein the second silane coupling agent is tetraethoxysilane.

4. The optical fiber core according to claim 1, wherein the first silane coupling agent comprises a radical-polymerizable reactive group and one or more methoxy group(s).

5. The optical fiber core according to claim 1, wherein the second silane coupling agent does not comprise any radical-polymerizable reactive groups, but comprises one or more ethoxy group(s).

6. The optical fiber core according to claim 1, wherein the water absorption rate of the secondary layer falls within the range of 1.5-3.0%.

7. The optical fiber core according to claim 1, wherein a content of the first silane coupling agent is 0.05-10 wt % of the ultraviolet-curable resin composition, which forms the primary layer after curing.

8. The optical fiber core according to claim 1, wherein a content of the second silane coupling agent is 0.05-10 wt % of the ultraviolet-curable resin composition, which forms the primary layer after curing.

* * * * *